(12) United States Patent
Khettry et al.

(10) Patent No.: US 11,129,118 B2
(45) Date of Patent: Sep. 21, 2021

(54) SYSTEMS AND METHODS FOR IDENTIFYING AND CONFIGURING A RADIOHEAD FOR A NETWORK SIMULATION TEST PLATFORM

(71) Applicant: Verizon Patent and Licensing Inc., Arlington, VA (US)

(72) Inventors: Dhruv Khettry, Manalapan, NJ (US); Namrata Prakash, Short Hills, NJ (US); Krishna Pichumani Iyer, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 46 days.

(21) Appl. No.: 16/525,167

(22) Filed: Jul. 29, 2019

(65) Prior Publication Data

US 2021/0037485 A1 Feb. 4, 2021

(51) Int. Cl.
*H04W 56/00* (2009.01)
*H04L 5/00* (2006.01)
*H04W 72/00* (2009.01)
*H04W 24/06* (2009.01)

(52) U.S. Cl.
CPC ......... *H04W 56/001* (2013.01); *H04L 5/0044* (2013.01); *H04W 24/06* (2013.01); *H04W 72/005* (2013.01)

(58) Field of Classification Search
CPC . H04W 56/001; H04W 72/005; H04W 24/06; H04L 5/0044
See application file for complete search history.

(56) References Cited

U.S. PATENT DOCUMENTS

| | | | |
|---|---|---|---|
| 10,420,154 B2* | 9/2019 | Tavildar | H04W 24/08 |
| 2010/0291926 A1* | 11/2010 | Ito | H04W 48/18 455/434 |
| 2014/0369257 A1* | 12/2014 | Borromeo | H04W 48/20 370/328 |
| 2017/0034756 A1* | 2/2017 | Faccin | H04W 28/0268 |
| 2019/0115955 A1* | 4/2019 | Wilson | H04L 5/0048 |
| 2019/0320398 A1* | 10/2019 | Park | H04L 5/0048 |

* cited by examiner

*Primary Examiner* — Harry H Kim (57) ABSTRACT

A system described herein may provide for the identification and configuration of a radiohead of a previously unknown type. A set of radio frequency ("RF") signals, encoded in a time and frequency domain and broadcast by the radiohead, may be identified. A set of synchronization signals may be identified in the RF signals. A set of candidate radioheads, associated with pilot signals that correspond to the identified synchronization signals, may be identified. Decoding techniques, associated with the candidate radioheads, may be used, based on the synchronization signals, to identify a Master Information Block ("MIB") in the RF signals, based on which the radiohead may be identified and configured.

20 Claims, 5 Drawing Sheets

SYSTEMS AND METHODS FOR IDENTIFYING AND CONFIGURING A RADIOHEAD FOR A NETWORK SIMULATION TEST PLATFORM

BACKGROUND

Wireless telecommunication networks may communicate with User Equipment ("UE") via radio frequency ("RF") signals. Wireless telecommunications network providers may desire to test, or simulate, network conditions in order to improve the service provided by wireless telecommunications networks. Radioheads may be used when simulating a radio access network ("RAN") portion of a wireless telecommunications network.

DETAILED DESCRIPTION OF THE PREFERRED EMBODIMENTS

The following detailed description refers to the accompanying drawings. The same reference numbers in different drawings may identify the same or similar elements.

Wireless telecommunications network providers may wish to configure network simulation environments, in which some or all of a wireless telecommunications network may be simulated. For example, a wireless telecommunications network provider may desire to use one or more radioheads to simulate a RAN portion of the wireless telecommunications network. Different radioheads may operate differently (e.g., may communicate using different protocols, may use different synchronization signals, may have different configurable parameters, etc.), which may complicate the task of using multiple different radioheads (e.g., the provider may need to manually configure each different radiohead upon initial installation), and/or may constrain a wireless telecommunications network provider to use a particular known type of radiohead.

Figure 1:
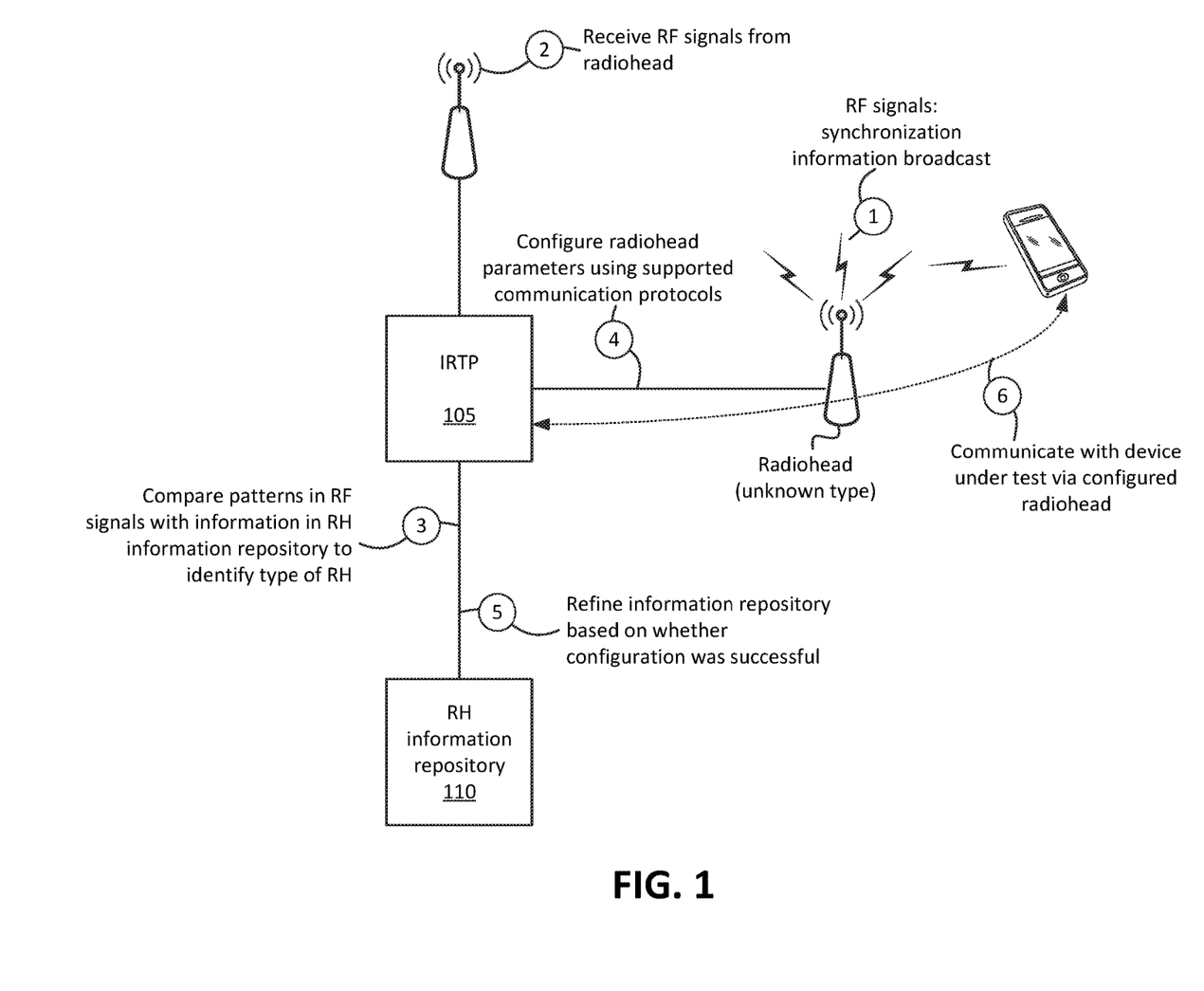
FIG. 1 illustrates an example overview of one or more embodiments described herein, in which a radiohead of an unknown type may be identified based on RF signals broadcast by the radiohead, and configured for a network simulation test.

In accordance with some embodiments described herein, an Intelligent Radiohead Test Platform ("IRTP") may automatically (e.g., using machine learning and/or other techniques) identify a radiohead without manually (e.g., through human intervention) receiving information as to the identity or type of radiohead. For example, as shown in FIG. 1, a radiohead of an unknown type (e.g., where the type of the radiohead is "unknown" to IRTP 105 inasmuch as IRTP 105 has not received identifying information for the radiohead) may broadcast (at 1) RF signals. The broadcast RF signals may be encoded with information, such as synchronization information (e.g., a pilot signal, a primary synchronization signal ("PSS"), a secondary synchronization signal ("SSS"), or the like). In some embodiments, the RF signals may be encoded in a time domain and a frequency domain. However, since different types of radioheads may broadcast different synchronization information, attempting to decode the broadcast synchronization information without knowledge of the type of the radiohead (and/or of the encoding techniques or algorithms used to encode the synchronization information) may be excessively time-consuming and/or impossible.

In accordance with some embodiments described herein, IRTP 105 may receive (at 2) the RF signals broadcast by the radiohead. For instance, IRTP 105 may include a radio component (e.g., an RF transceiver) that is capable of receiving the RF signals from the radiohead, and providing an analog waveform, that represents the RF signals, to one or more other components of IRTP 105 for further analysis, as described herein. For instance, as described in greater detail below, IRTP 105 may use machine learning and/or other techniques to identify the radiohead based on the RF signals broadcast by the radiohead. IRTP 105 may, for example, compare (at 3) the RF signals to RF signals, that represent pilot signals, PSSs, SSSs, and/or other types of signals of previously identified radioheads (e.g., where radiohead information repository 110 may store information regarding previously identified radioheads, along with information that may assist in using machine learning techniques to identify radioheads). For example, IRTP 105 may identify a pilot signal, PSS, SSS, etc. by comparing one or more repeating signals in the RF broadcast (e.g., a signal that is constant across a set frequency range and repeats on a periodic interval) to pilot signals of previously identified radioheads. IRTP 105 may further identify one or more repeating patterns (e.g., repeating in a time domain and/or in a frequency domain) in the signals broadcast by the radiohead to identify a pilot signal, PSS, SSS, etc., and may use decoding techniques associated with one or more radioheads that have a same or similar pilot signal as the pilot signal identified by IRTP 105.

Once the radiohead is identified (or potentially identified), IRTP 105 may configure the radiohead (e.g., via an interface used by the radiohead to communicate with a baseband unit ("BBU") and/or other controller). In this manner, IRTP 105 may act as, or simulate, a BBU with respect to the radiohead. That is, IRTP 105 may communicate with the radiohead using communication protocols and parameters that are associated with the identified (or potentially identified) radiohead.

If the radiohead has been properly identified, the radiohead may respond with an acknowledgement or confirmation of the configuration, and/or may begin acting in accordance with the configuration. If, on the other hand, the radiohead has not been properly identified, then the radiohead may not respond to the configuration, may reply with an error message, and/or may otherwise not act in accordance with the parameters. In this scenario, IRTP 105 may attempt to communicate with the radiohead using communication protocols and/or parameters associated with another candidate radiohead (e.g., a next closest matching radiohead, as determined based on the RF signals received from the radiohead).

IRTP 105 may also refine (at 5) information in radiohead information repository 110, based on the attempts to identify and/or configure the radiohead. For example, if the configuration (at 4) is successful, IRTP 105 may provide (at 5) information regarding the RF signals broadcast by the radiohead (e.g., identified patterns in time and/or frequency domains), which may aid in identifying the same radiohead in a future identification process. Similarly, if the configuration (at 4) is unsuccessful, IRTP 105 may provide (at 5) information regarding the RF signals broadcast by the radiohead (e.g., identified patterns in time and/or frequency domains), which may aid in eliminating the same radiohead as a candidate in a future identification process.

Once configured, IRTP 105 may communicate (at 5), via the radiohead, with one or more wireless devices, such as a UE that is configured to communicate via an RF interface. IRTP 105 may further simulate one or more components of a wireless telecommunications core network and/or a Packet Data Network ("PDN"), such as the Internet, such as by sending and/or receiving traffic to and/or from the UE via the configured radiohead. Thus, IRTP 105 may further serve as a testing platform for the radiohead, without the need to connect the radiohead to an actual wireless telecommunications network.

Figure 2:
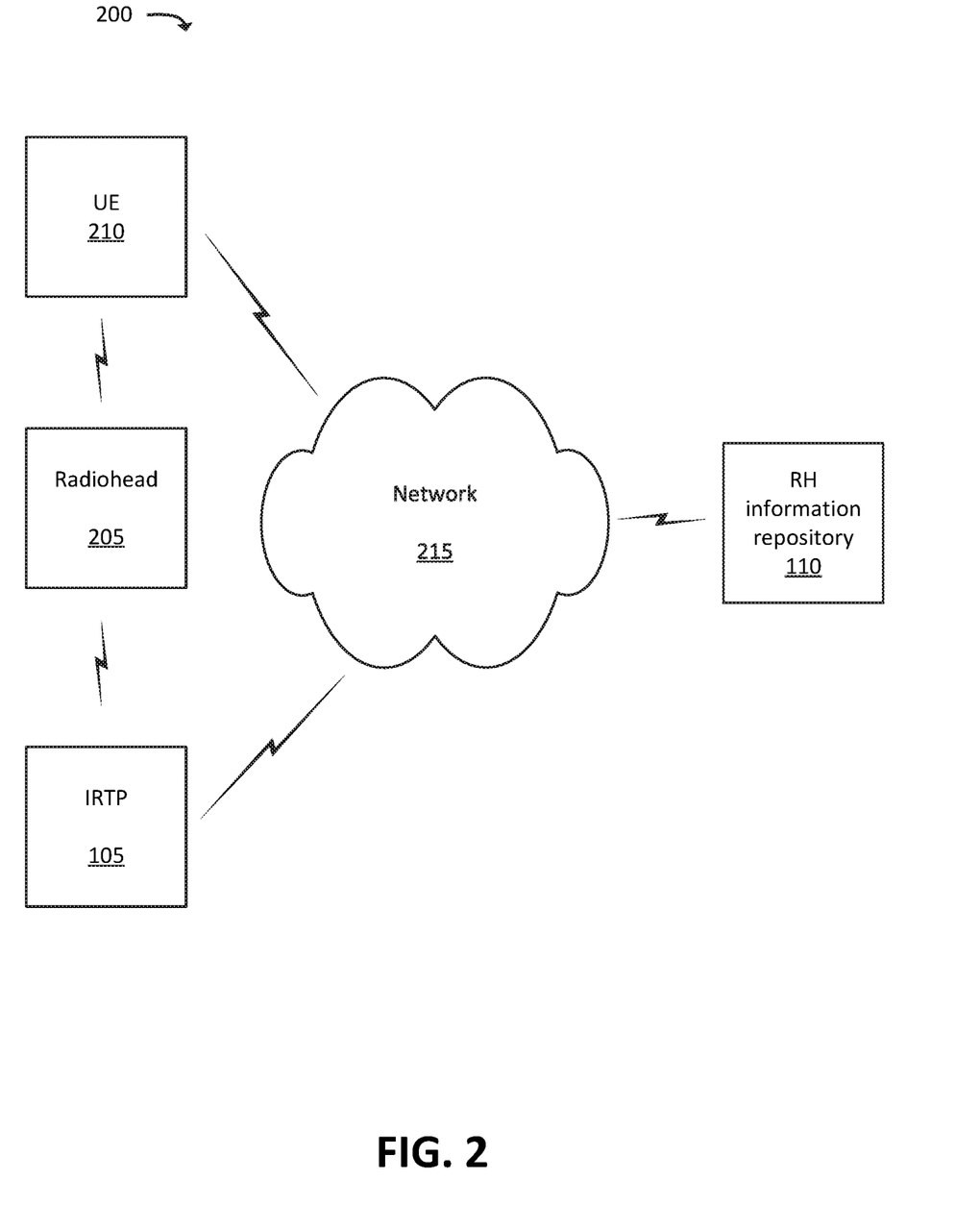
FIGS. 2 and 3 illustrate example environments in which one or more embodiments, described herein, may be implemented.

FIG. 2 illustrates an example environment 200, in which in which one or more embodiments may be implemented. As shown, environment 200 may include IRTP 105, radiohead information repository 110, radiohead 205, UE 210, and network 215. The quantity of devices and/or networks, illustrated in FIG. 2, is provided for explanatory purposes only. In practice, environment 200 may include additional devices and/or networks; fewer devices and/or networks; different devices and/or networks; or differently arranged devices and/or networks than illustrated in FIG. 2. For example, while not shown, environment 200 may include devices that facilitate or enable communication between various components shown in environment 200, such as routers, modems, gateways, switches, hubs, etc. Alternatively, or additionally, one or more of the devices of environment 200 may perform one or more functions described as being performed by another one or more of the devices of environment 200. Devices of environment 200 may interconnect with each other and/or other devices via wired connections, wireless connections, or a combination of wired and wireless connections. In some implementations, one or more devices of environment 200 may be physically integrated in, and/or may be physically attached to, one or more other devices of environment 200.

IRTP 105 may include a computation and communication device (and/or a collection of devices, such as a distributed system) that performs one or more functions described herein. For example, IRTP 105 may include circuitry to communicate with radiohead 205 via an air interface (e.g., to receive RF signals transmitted by radiohead 205). IRTP 105 may additionally include circuitry and/or other components to communicate with radiohead 205 via a wired interface (e.g., an optical interface). As described herein, radiohead 205 may perform baseband processing functionality and/or other control functionality with regard to radiohead 205. In some embodiments, radiohead 205 may implement one or more functions associated with a wireless telecommunications network core network. For example, as described below with respect to FIG. 3, radiohead 205 may implement one or more functions of a Fifth Generation ("5G") network. In some embodiments, radiohead 205 may implement one or more functions of another type of network (e.g., a Third Generation ("3G") core network, a Fourth Generation ("4G") core network, a Long-Term Evolution ("LTE") core network, etc.).

Radiohead information repository 110 may include a computation and communication device (and/or a collection of devices, such as a distributed system) that performs one or more functions described herein. For example, radiohead information repository 110 may include one or more databases and/or other suitable devices or systems to store and provide information that may be used to identify radiohead 205, in accordance with embodiments described in greater detail below.

Radiohead 205 may include a device that includes hardware circuitry (e.g., one or more radio transceivers) to communicate with one or more devices via an RF interface. For example, radiohead 205 may broadcast synchronization information and/or other RF signals, which IRTP 105 may use to identify radiohead 205, in accordance with embodiments described herein. Radiohead 205 may also receive configuration parameters from IRTP 105, and may communicate with UE 210 in accordance with the configuration parameters. Additionally, or alternatively, radiohead 205 may communicate with IRTP 105 and/or some other device or system (e.g., a BBU or some other suitable device of a wireless telecommunications network) based on the parameters.

UE 210 may include a computation and communication device, such as a wireless mobile communication device that is capable of communicating with radiohead 205 and/or network 215. UE 210 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, a Mobile-to-Mobile ("M2M") device, or another type of mobile computation and communication device.

Network 215 may include one or more wired and/or wireless networks. For example, network 215 may include an IP-based PDN, a wide area network ("WAN") such as the Internet, a private enterprise network, and/or one or more other networks. UE 210, IRTP 105, and/or other devices or systems may communicate, through network 215, with data servers, other UEs 210, radiohead information repository 110, and/or to other servers or applications that are coupled to network 215. Network 215 may be connected to one or more other networks, such as a public switched telephone network ("PSTN"), a public land mobile network ("PLMN"), and/or another network.

Figure 3:
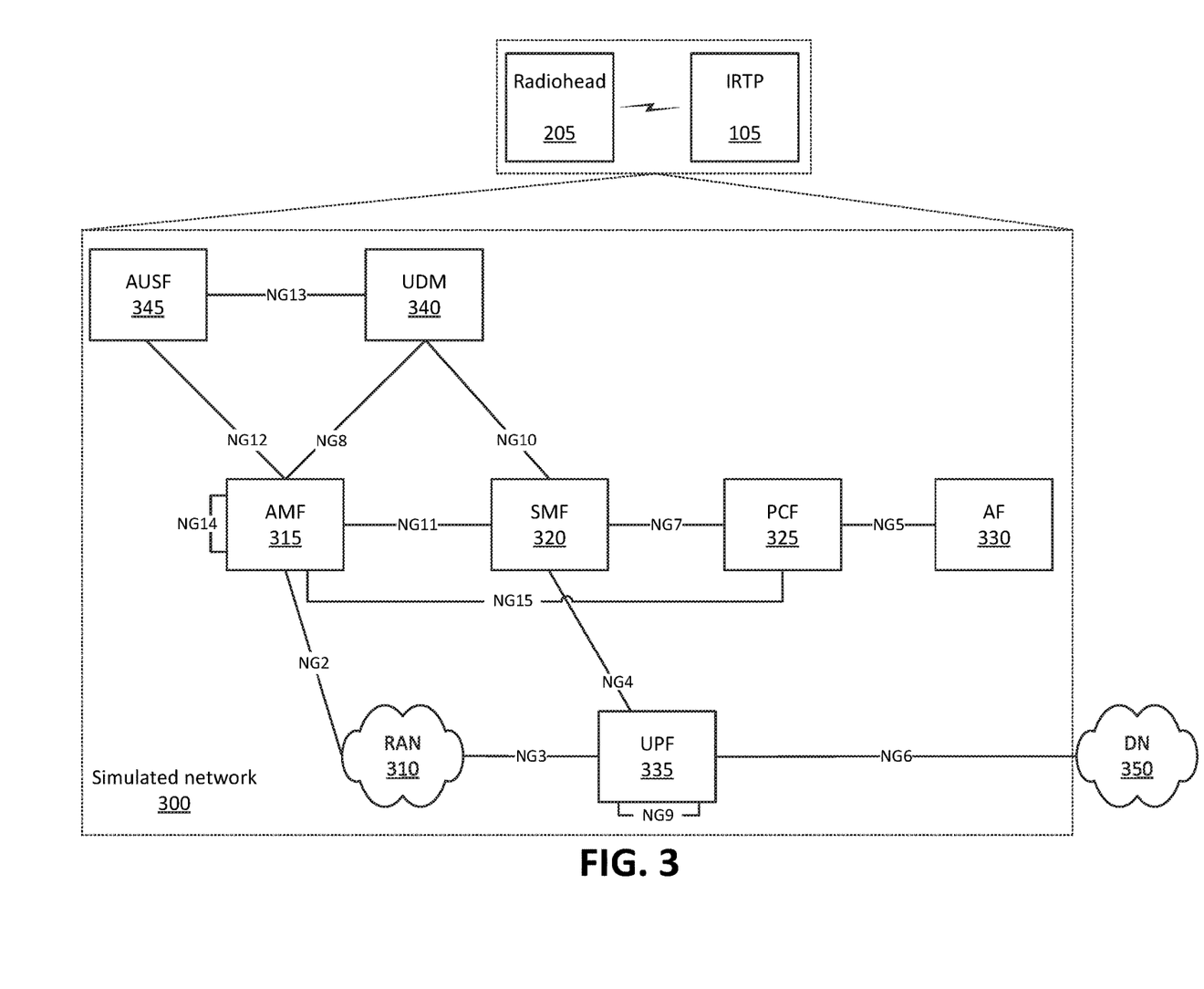

FIG. 3 conceptually illustrates an example of a simulated network 300, which may be implemented in whole or in part by one or more devices shown in FIG. 2. For instance, as shown in this example, simulated network 300 may be implemented by IRTP 105, in conjunction with radiohead 205. Simulated network 300 is shown in this example as a 5G network. However, in some embodiments, simulated network 300 may be, or may include, another type of network (e.g., a 3G network, a 4G network, etc.).

As shown, simulated network 300 may include Radio Access Network ("RAN") 310, Access and Mobility Management Function ("AMF") 315, Session Management Function ("SMF") 320, Policy Control Function ("PCF") 325, Application Function ("AF") 330, User Plane Function ("UPF") 335, UDM 340, and Authentication Server Function ("AUSF") 345. Simulated network 300 may be coupled to an external network, such as Data Network ("DN") 350.

RAN 310 may be, or may include, a 5G RAN that includes one or more base stations (or simulates one or more base stations), via which UE 210 may communicate with one or more other elements of environment 300. UE 210 may communicate with RAN 310 via an air interface. In some embodiments, the air interface may be provided via radiohead 205. For instance, RAN 310 may receive traffic (e.g., voice call traffic, data traffic, messaging traffic, signaling traffic, etc.) from UE 210 via the air interface, and may communicate the traffic to UPF 335, and/or one or more other devices or networks. Similarly, RAN 310 may receive traffic intended for UE 210 (e.g., from UPF 335, AMF 315, and/or one or more other devices or networks) and may communicate the traffic to UE 210 via the air interface.

AMF 315 may perform operations to register UE 210 with the 5G network, to establish bearer channels associated with a session with UE 210, to hand off UE 210 from the 5G network to another network, to hand off UE 210 from the other network to the 5G network, and/or to perform other operations. In some embodiments, the 5G network may include multiple AMFs 315, which communicate with each other via the NG14 interface (denoted in FIG. 3 by the line marked "NG14" originating and terminating at AMF 315).

SMF 320 may facilitate in the establishment of communication sessions on behalf of UE 210. In some embodiments, the establishment of communications sessions may be performed in accordance with one or more policies provided by PCF 325. PCF 325 may receive information regarding policies and/or subscriptions from one or more sources, such as subscriber databases and/or from one or more users (such as, for example, an administrator associated with PCF 325). AF 330 may receive, store, and/or provide information that may be used in determining parameters (e.g., quality of service parameters, charging parameters, or the like) for certain applications.

UPF 335 may receive, store, and/or provide data (e.g., user plane data). For example, UPF 335 may receive user plane data (e.g., voice call traffic, data traffic, etc.), destined for UE 210, from DN 350, and may forward the user plane data toward UE 210 (e.g., via RAN 310). The delivery of content, via multiple UPFs 335, to UE 210 may be coordinated via the NG9 interface (e.g., as denoted in FIG. 3 by the line marked "NG9" originating and terminating at UPF 335). Similarly, UPF 335 may receive traffic from UE 210 (e.g., via RAN 310, SMF 320, and/or one or more other devices), and may forward the traffic toward DN 350. In some embodiments, UPF 335 may communicate (e.g., via the NG4 interface) with SMF 320, regarding user plane data processed by UPF 335. This information may aid SMF 320 in monitoring (e.g., tracking, counting, etc.) the traffic for particular subscribers.

AUSF 345 and UDM 350 may manage, update, and/or store, in one or more memory devices associated with AUSF 345 and/or UDM 350, profile information associated with a subscriber. AUSF 345 and/or UDM 350 may perform authentication, authorization, and/or accounting operations associated with the subscriber and/or a communication session with UE 210.

DN 350 may include one or more wired and/or wireless networks. For example, DN 350 may include an IP-based PDN, a wide area network ("WAN") such as the Internet, a private enterprise network, and/or one or more other networks. UE 210 may communicate, through DN 350, with data servers, other UEs 210, and/or to other servers or applications that are coupled to DN 350. DN 350 may be connected to one or more other networks, such as a public switched telephone network ("PSTN"), a public land mobile network ("PLMN"), and/or another network. DN 350 may be connected to one or more other devices, such as content providers, applications, web servers, and/or other devices, with which UE 210 may communicate.

Figure 4:
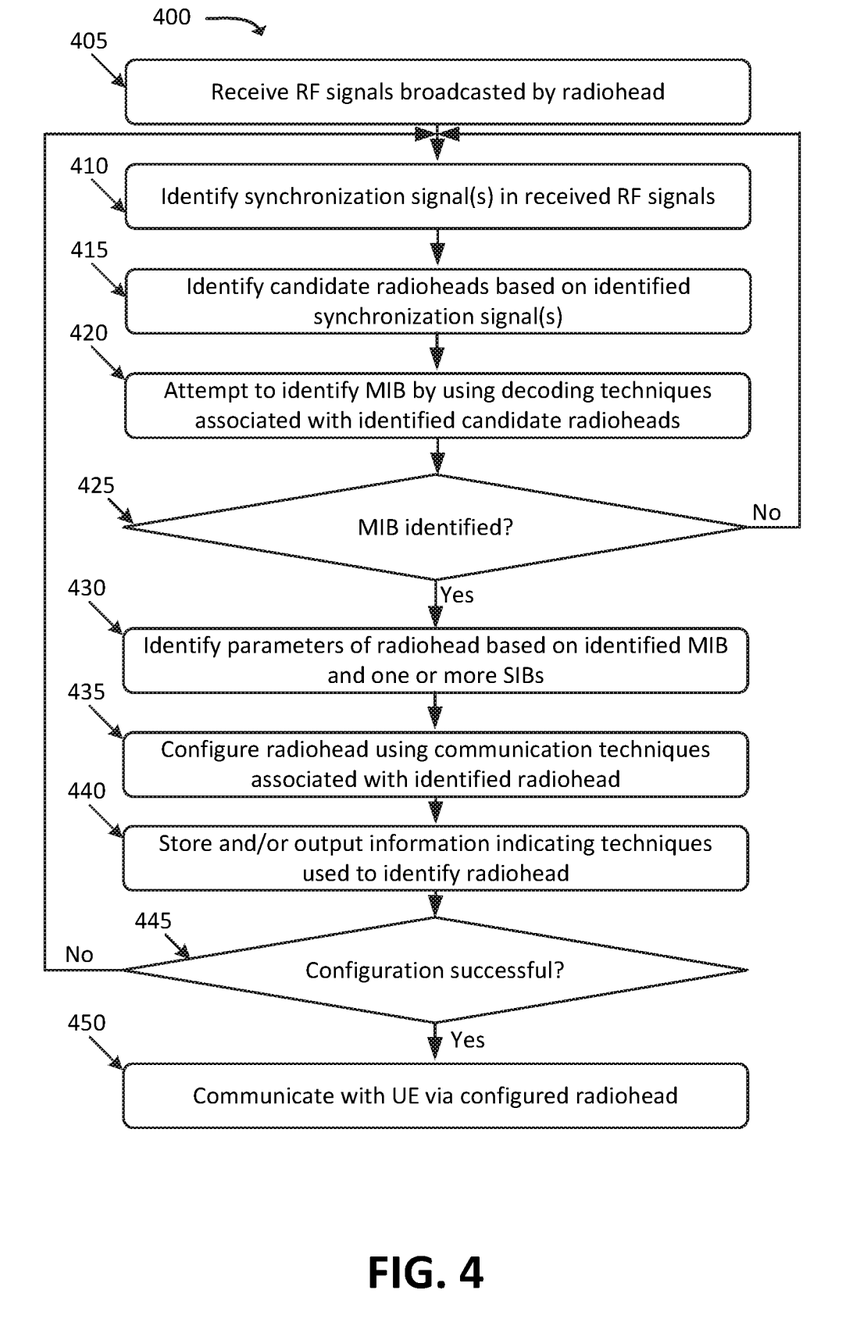
FIG. 4 illustrates an example process for identifying a radiohead based on RF signals broadcast by the radiohead, and configuring the radiohead for a network simulation test.

FIG. 4 illustrates an example process 400 for identifying a radiohead based on RF signals broadcast by the radiohead, and configuring the radiohead for a network simulation test. In some embodiments, some or all of process 400 may be performed by IRTP 105 (e.g., in conjunction with one or more other devices or systems, such as radiohead information repository 110 and/or radiohead 205).

As shown, process 400 may include receiving (at 405) RF signals broadcast by a radiohead. For instance, IRTP 105 may receive (e.g., via an RF component of IRTP 105) RF signals broadcast by radiohead 205. As discussed above, radiohead 205 may broadcast RF signals encoded with synchronization information, such as a pilot signal, a PSS, an SSS, or the like. In some scenarios, the encoding techniques, used by radiohead 205 to encode the synchronization information in the broadcast RF signals, may not be known to IRTP 105. For instance, radiohead 205 may be a radiohead that has been powered on in proximity of IRTP 105 (e.g., within range of IRTP 105, such that the RF signals broadcast by radiohead 205 are able to be received by IRTP 105), but for which IRTP 105 is not configured to communicate with. As mentioned above, an RF component of IRTP 105 may generate one or more analog waveforms, and/or a representation of one or more analog waveforms, that correspond to the received RF signals. As mentioned above, the RF signals may be encoded on a time and frequency domain, and the resulting waveform(s) (and/or other representation) may represent the RF signals in both time and frequency domains.

Process 400 may also include identifying (at 410) one or more synchronization signals in the received RF signals. For example, IRTP 105 may analyze the RF signals (e.g., the analog waveform) to identify a repeating signal (e.g., a signal, or set of signals, that occupies one or more subcarriers, and repeats on a periodic or other pre-defined basis). IRTP 105 may, for example, compare the received RF signals to previously identified synchronization signals (or synchronization signal patterns or configurations) to identify the pilot signal in the received RF signals. As discussed above, the identified synchronization signals may include a PSS and/or an SSS. In some embodiments, the identified synchronization signals may include, or may be known as, pilot signals and/or some other suitable type of signal.

IRTP 105 may, for example, identify repeating patterns of signals within a given time period and/or across a given set of carriers or subcarriers. For example, one repeating pattern may include a constant signal across a relatively large quantity of subcarriers (e.g., 95% of subcarriers in a given range, 80% of subcarriers in a given range, etc.) that is periodically repeated, and a second repeating pattern may include a second constant signal across a relatively large quantity of subcarriers that is periodically repeated after the first signal. IRTP 105 may, for example, determine that the first repeating signal is a PSS, and that the second repeating signal is a SSS.

Process 400 may further include identifying (at 415) a set of candidate radioheads based on the identified pilot signal. For instance, based on the pilot signal, IRTP 105 may be able to identify a set of candidate types of radioheads (e.g., previously identified or known types of radioheads) with which the identified synchronization signal(s) may be associated. For example, the radioheads in the set of candidate radioheads may have previously been identified as being associated with a synchronization signal, or pattern of synchronization signals, that matches the one or more synchronization signals in the RF signals from radiohead 205. Identifying the candidate radioheads may allow IRTP 105 to proceed with further analysis, such as by defining carrier spacing and/or timing based on which a MIB may be identified in the RF signals from radiohead 205. In some embodiments, IRTP 105 may rank or prioritize radioheads, of the candidate set of radioheads, based on a measure of confidence of each of the radioheads (e.g., based on a closest match between the identified synchronization signal(s) and synchronization signals associated with the candidate radioheads). In some embodiments, IRTP 105 may forgo ranking the radioheads of the candidate set of radioheads, and/or may rank the radioheads using some other ranking criteria.

Process 400 may additionally include attempting (at 420) to identify a Master Information Block ("MIB") using decoding techniques associated with the identified candidate radioheads. For example, the candidate radioheads may be associated with particular decoding techniques and/or parameters associated with decoding techniques (e.g., techniques to decode signals that were encoded using turbo coding, convolutional coding, low-density parity-check coding, polar coding, and/or other suitable encoding techniques). IRTP 105 may attempt to use decoding techniques associated with the candidate radioheads (e.g., in an order based on the ranking mentioned above).

Process 400 may also include determining (at 425) whether a MIB was identified. For example, if using a particular decoding technique (e.g., as mentioned above), associated with a particular radiohead, yields a readable MIB, IRTP 105 may determine that radiohead 205, from which the RF signals is received, is particular radiohead of the set of candidate radioheads. If a MIB is identified (at 425—YES), the process 400 may proceed to block 430, described below.

If, on the other hand, a MIB was not identified (at 425—NO), then process 400 may include attempting again to identify (at 410) one or more synchronization signals in the RF signals broadcast by the radiohead, and continuing (e.g., at 415-425) to determine whether the MIB was identified, until a MIB is identified (at 425—YES). For example, IRTP 105 may use a frequency and/or time offset, based on the identified PSS and/or SSS, to attempt to identify the MIB.

For instance, as similarly discussed above, IRTP 105 may use one or more decoding techniques associated with the radioheads, of the set of candidate radioheads, to identify the MIB. In some embodiments, IRTP 105 may attempt to use different frequency and/or time offsets, based on the PSS and/or SSS, and/or different decoding techniques, until the MIB is identified. IRTP 105 may, in some embodiments, use information from radiohead information repository 110 to determine which decoding techniques to use, and/or which frequency and/or time offsets to use when attempting to locate the MIB. For instance, IRTP 105 may determine that a particular radiohead, for which information is stored in radiohead information repository 110, has same or similar characteristics of the PSS and/or SSS (e.g., a same or similar set of subcarriers used by the PSS and/or SSS, and/or a same or similar time spacing between the PSS and the SSS). Based on determining that the particular radiohead, for which information is stored in radiohead information repository 110, has similar characteristics of the identified PSS and/or SSS, IRTP 105 may utilize decoding techniques associated with the particular radiohead to attempt to decode the MIB in the RF signals broadcast by radiohead 205. Additionally, IRTP 105 may rank one or more radioheads, for which information is stored in radiohead information repository 110, based on a measure of similarity of characteristics of the PSS and/or SSS associated with the one or more radioheads to the characteristics of the PSS and/or SSS in the RF signals broadcast by IRTP 105. If using a given set of decoding techniques does not yield a readable MIB, IRTP 105 may proceed to use a set of decoding techniques associated with another radiohead (e.g., a next highest ranked radiohead) until an MIB is decoded.

Process 400 may additionally include identifying (at 430) parameters of the radiohead based on the identified MIB. For example, IRTP 105 may identify parameters such as radio minimum power, radio maximum power, carrier spacing parameters, carrier aggregation parameters, and/or other parameters included in the MIB and/or in other information that is identified based on the MIB. For example, in some embodiments, the RF signals may include one or more System Information Blocks (SIBs), which may include some or all of the above-mentioned information, and which may be identified and/or decoded based on information provided in the MIB.

Process 400 may also include configuring (at 435) the radiohead using communication techniques associated with the identified radiohead. For example, IRTP 105 may configure one or more the identified parameters based on a particular configuration. The configuration may be provided by an operator of IRTP 105, and/or may be automatically generated by IRTP 105 and/or some other device or system. The configuration of radiohead 205 may allow one or more UEs 210 to communicate with radiohead 205 (and/or to communicate with IRTP 105 via radiohead 205). For example, as discussed above, IRTP 105 and radiohead 205 may communicate via an interface (e.g., a wired interface, such as an optical interface), in which IRTP 105 may simulate one or more components of a wireless telecommunications core network and/or portions of a RAN (e.g., a BBU).

Process 400 may further include storing and/or outputting (at 440) information indicating techniques used to identify the radiohead. For example, IRTP 105 may store information (e.g., in radiohead information repository 110) indicating which decoding techniques were attempted, what frequency and/or timing offsets were used to identify a MIB, what time offsets were used (e.g., relative to the pilot signal) were used to identify the PSS and/or SSS, and/or other information indicating how the MIB was identified. This information may be used in subsequent iterations of process 400 (e.g., to identify one or more other radioheads).

For instance, IRTP 105 may use one or more machine learning techniques (e.g., a Bayesian classifier algorithm, a K-Means clustering algorithm, neural networks, and/or other types of machine learning techniques) based on the information stored in IRTP 105. Generally speaking, for example, another radiohead 205, which has same or similar characteristics (e.g., same or similar decoding techniques, frequency and/or timing offsets, etc.) as a particular radiohead 205, may be identified based on the similarity to the information stored in radiohead information repository 110 for the particular radiohead 205. Additionally, IRTP 105 may determine that another radiohead 205, which has dissimilar characteristics to information regarding a particular radiohead 205, is not a same type as the particular radiohead 205.

Process 400 may further include determining (at 445) whether the configuration was successful. For instance, IRTP 105 may determine whether traffic is able to be sent and/or received (e.g., to and/or from one or more UEs 210) via radiohead 205. If the configuration was successful (at 445—YES), then process 400 may further include communicating (at 450) with one or more UEs via the configured radiohead. For example, the communication with the one or more UEs via the configured radiohead may result in a simulated wireless telecommunications network, with simulated network conditions, communicating with the one or more UEs.

If, on the other hand, the configuration was not successful (at 445—NO), then process 400 may return to block 410, to continue attempting to identify the radiohead (e.g., by attempting to identify a MIB in the RF signals broadcast by the radiohead, in a manner similar to that described above). Additionally, IRTP 105 may store (e.g., in radiohead information repository 110) information indicating that the identification of radiohead 205 was not successful (e.g., that characteristics identified with respect to radiohead 205 do not accurately match a radiohead that was identified as being a same type as radiohead 205). This indication may be used in subsequent identifications of one or more other radioheads 205.

Figure 5:
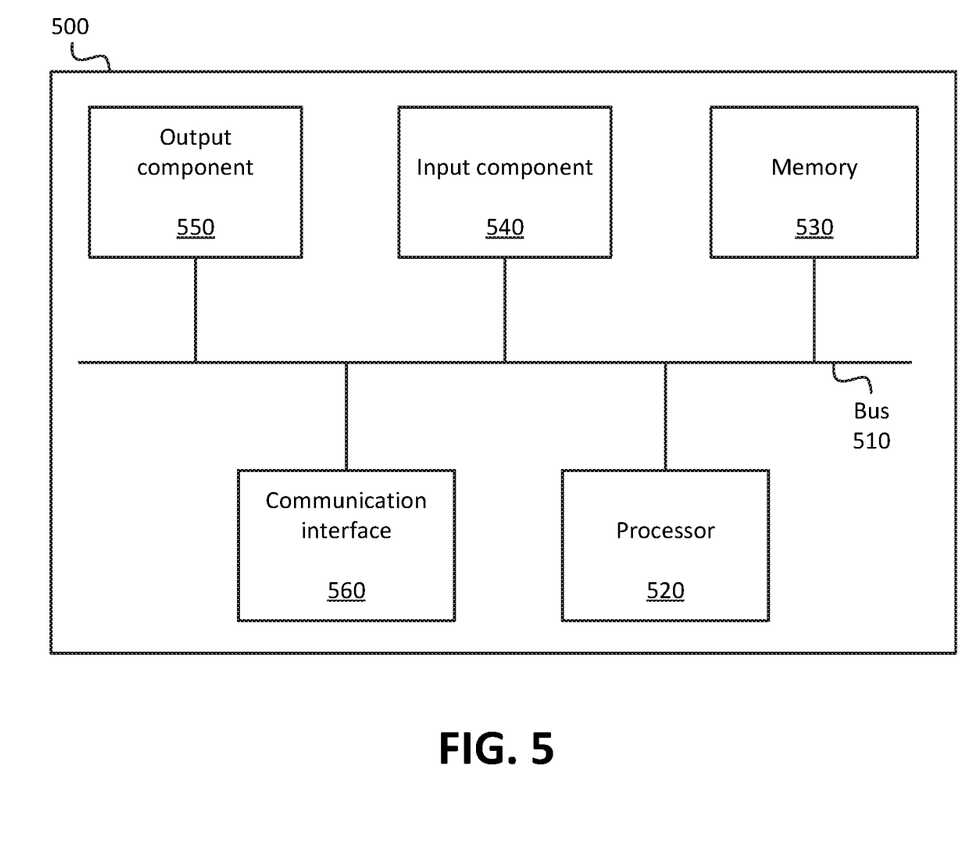
FIG. 5 illustrates example components of one or more devices, according to one or more embodiments described herein.

FIG. 5 illustrates example components of device 500. One or more of the devices described above may include one or more devices 500. Device 500 may include bus 510, processor 520, memory 530, input component 540, output component 550, and communication interface 560. In another implementation, device 500 may include additional, fewer, different, or differently arranged components.

Bus 510 may include one or more communication paths that permit communication among the components of device 500. Processor 520 may include a processor, microprocessor, or processing logic that may interpret and execute instructions. Memory 530 may include any type of dynamic storage device that may store information and instructions for execution by processor 520, and/or any type of non-volatile storage device that may store information for use by processor 520.

Input component 540 may include a mechanism that permits an operator to input information to device 500, such as a keyboard, a keypad, a button, a switch, etc. Output component 550 may include a mechanism that outputs information to the operator, such as a display, a speaker, one or more light emitting diodes ("LEDs"), etc.

Communication interface 560 may include any transceiver-like mechanism that enables device 500 to communicate with other devices and/or systems. For example, communication interface 560 may include an Ethernet interface, an optical interface, a coaxial interface, or the like. Communication interface 560 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 500 may include more than one communication interface 560. For instance, device 500 may include an optical interface and an Ethernet interface.

Device 500 may perform certain operations relating to one or more processes described above. Device 500 may perform these operations in response to processor 520 executing software instructions stored in a computer-readable medium, such as memory 530. A computer-readable medium may be defined as a non-transitory memory device. A memory device may include space within a single physical memory device or spread across multiple physical memory devices. The software instructions may be read into memory 530 from another computer-readable medium or from another device. The software instructions stored in memory 530 may cause processor 520 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described with regard to FIGS. 1 and 5, the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction thresholds. To the extent that the term "greater than" (or similar terms) is used herein to describe a relationship of a value to a threshold, it is to be understood that the term "greater than or equal to" (or similar terms) could be similarly contemplated, even if not explicitly stated. Similarly, to the extent that the ten "less than" (or similar terms) is used herein to describe a relationship of a value to a threshold, it is to be understood that the term "less than or equal to" (or similar terms) could be similarly contemplated, even if not explicitly stated. Further, the term "satisfying," when used in relation to a threshold, may refer to "being greater than a threshold," "being greater than or equal to a threshold," "being less than a threshold," "being less than or equal to a threshold," or other similar terms, depending on the appropriate context.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more radios configured to receive radio frequency ("RF") signals, encoded on a time and frequency domain, that have been broadcast by a particular radiohead;
   a non-transitory computer-readable medium storing a set of processor-executable instructions; and
   one or more processors configured to execute the set of processor-executable instructions, wherein executing the set of processor-executable instructions causes the one or more processors to:
   identify one or more synchronization signals, in the received RF signals, on the time and frequency domain;
   identify a plurality of candidate radioheads that are associated with pilot signals that correspond to the identified one or more synchronization signals, in the RF signals;
   determine one or more decoding techniques associated with at least one of the plurality of candidate radioheads, wherein the determining of the one or more decoding techniques associated with at least one of the plurality of candidate radioheads is performed iteratively and includes:
      attempting to decode a Master Information Block ("MIB") using a first set of decoding techniques;
      determining that the MIB was not decoded using the first set of decoding techniques;
      attempting to decode the MIB using a second set of decoding techniques; and
      determining that the MIB was decoded using the second set of decoding techniques, wherein the determined one or more decoding techniques include the second set of decoding techniques;
   identify the MIB encoded in the RF signals based on the identified one or more synchronization signals and the determined one or more decoding techniques associated with at least one of the plurality of candidate radioheads;
   identify one or more configurable parameters associated with the particular radiohead based on the identified MIB; and
   output a configuration of the one or more configurable parameters to the particular radiohead, wherein the configuration of the one or more configurable parameters allows the particular radiohead to wirelessly communicate with a User Equipment ("UE").

2. The device of claim 1, wherein executing the set of processor-executable instructions further causes the one or more processors to:
   communicate with the UE via the configured particular radiohead.

3. The device of claim 1, wherein executing the set of processor-executable instructions further causes the one or more processors to store information correlating:
   the identified synchronization signals, and
   the determined one or more decoding techniques used to identify the MIB.

4. The device of claim 1, wherein executing the set of processor-executable instructions, to identify the synchronization signals, further causes the one or more processors to:
   identify a Primary Synchronization Signal ("PSS"); and
   identify a Secondary Synchronization Signal ("SSS").

5. The device of claim 4, wherein the PSS is located, in the time and frequency domain, closer to the MIB than the SSS.

6. The device of claim 1, wherein the device and the particular radiohead are communicatively coupled via:
   a wireless interface via the one or more radios of the device, and
   another interface, distinct from the wireless interface, via which the configuration is outputted to the particular radiohead.

7. The device of claim 1, wherein identifying the MIB includes identifying a frequency or timing offset, relative to the identified one or more synchronization signals,
   wherein identifying the one or more configurable parameters associated with the particular radiohead is further based on the identified frequency or timing offset.

8. A non-transitory computer-readable medium, storing a set of processor-executable instructions, which, when executed by one or more processors of a device, cause the one or more processors to:
   identify one or more synchronization signals, in a set of radio frequency ("RF") signals that are encoded on a time and frequency domain and have been broadcast by a particular radiohead;
   identify a plurality of candidate radioheads that are associated with the identified one or more synchronization signals, in the set of RF signals;
   determine one or more decoding techniques associated with at least one of the plurality of candidate radioheads, the determining including:
      attempting to decode a Master Information Block ("MIB") using a first set of decoding techniques;
      determining that the MIB was not decoded using the first set of decoding techniques;
      attempting, based on determining that the MIB was not decoded using the first set of decoding techniques, to decode the MIB using a second set of decoding techniques; and
      determining that the MIB was decoded using the second set of decoding techniques, wherein the determined one or more decoding techniques include the second set of decoding techniques;
   identify the MIB encoded in the set of RF signals based on the identified one or more synchronization signals and using the determined one or more decoding techniques associated with at least one of the plurality of candidate radioheads;
identify one or more configurable parameters associated with the particular radiohead based on the identified MIB; and
output a configuration of the one or more configurable parameters to the particular radiohead, wherein the configuration of the one or more configurable parameters allows the particular radiohead to wirelessly communicate with a User Equipment ("UE").

9. The non-transitory computer-readable medium of claim 8, wherein execution of the set of processor-executable instructions further causes the one or more processors to:
communicate with the UE via the configured particular radiohead.

10. The non-transitory computer-readable medium of claim 8, wherein execution of the set of processor-executable instructions further causes the one or more processors to store information correlating:
the identified synchronization signals, and
the determined one or more decoding techniques used to identify the MIB.

11. The non-transitory computer-readable medium of claim 8, wherein execution of the set of processor-executable instructions, to identify the synchronization signals, further causes the one or more processors to:
identify a Primary Synchronization Signal ("PSS"); and
identify a Secondary Synchronization Signal ("SSS").

12. The non-transitory computer-readable medium of claim 11, wherein the PSS is located, in the time and frequency domain, closer to the MIB than the SSS.

13. The non-transitory computer-readable medium of claim 8, wherein the device and the particular radiohead are communicatively coupled via:
a wireless interface via the one or more radios of the device, and
another interface, distinct from the wireless interface, via which the configuration is outputted to the particular radiohead.

14. A method, comprising:
identifying, by a device, one or more synchronization signals, in a set of radio frequency ("RF") signals that are encoded on a time and frequency domain and have been broadcast by a particular radiohead;
identifying, by the device, a plurality of candidate radioheads that are associated with the one or more synchronization signals, in the set of RF signals;
determining, by the device, one or more decoding techniques associated with at least one of the plurality of candidate radioheads, the determining including:
attempting to decode a Master Information Block ("MIB") using a first set of decoding techniques;
determining that the MIB was not decoded using the first set of decoding techniques;
attempting, based on determining that the MIB was not decoded using the first set of decoding techniques, to decode the MIB using a second set of decoding techniques; and
determining that the MIB was decoded using the second set of decoding techniques, wherein the determined one or more decoding techniques include the second set of decoding techniques;
identifying, by the device, the MIB encoded in the RF signals based on the identified one or more synchronization signals and the determined one or more decoding techniques associated with at least one of the plurality of candidate radioheads;
identifying, by the device, one or more configurable parameters associated with the particular radiohead based on the identified MIB; and
outputting, by the device, a configuration of the one or more configurable parameters to the particular radiohead, wherein the configuration of the one or more configurable parameters allows the particular radiohead to wirelessly communicate with a User Equipment ("UE").

15. The method of claim 14, further comprising:
communicating with the UE via the configured particular radiohead.

16. The method of claim 14, further comprising storing information correlating:
the identified synchronization signals, and
the determined one or more decoding techniques used to identify the MIB.

17. The method of claim 14, wherein identifying the synchronization signals further includes:
identifying a Primary Synchronization Signal ("PSS"); and
identifying a Secondary Synchronization Signal ("SSS").

18. The method of claim 17, wherein the PSS is located, in the time and frequency domain, closer to the MIB signal than the SSS.

19. The method of claim 14, wherein the device and the particular radiohead are communicatively coupled via:
a wireless interface via the one or more radios of the device, and
another interface, distinct from the wireless interface, via which the configuration is outputted to the particular radiohead.

20. The method of claim 14, wherein identifying the MIB includes identifying a frequency or timing offset, relative to the identified one or more synchronization signals,
wherein identifying the one or more configurable parameters associated with the particular radiohead is further based on the identified frequency or timing offset.

* * * * *